United States Patent [19]
Watts

[11] Patent Number: 5,704,568
[45] Date of Patent: Jan. 6, 1998

[54] AIRPLANE PIROUETTE STEERING SYSTEM

[75] Inventor: John Watts, Redmond, Wash.

[73] Assignee: The Boeing Company, Seattle, Wash.

[21] Appl. No.: 395,337

[22] Filed: Feb. 28, 1995

Related U.S. Application Data

[63] Continuation-in-part of Ser. No. 209,667, Mar. 9, 1994, abandoned.

[51] Int. Cl.$^6$ .......................... B64C 25/50; B64C 25/34; B64B 1/36
[52] U.S. Cl. .......................... 244/50; 244/52; 244/103 N
[58] Field of Search .......................... 244/50, 51, 103 W, 244/103 R, 52; 280/81.5, 97

[56] References Cited

U.S. PATENT DOCUMENTS

| | | | |
|---|---|---|---|
| 2,538,388 | 1/1951 | Sievers | 244/50 |
| 2,869,888 | 1/1959 | Burger | 280/81.5 |
| 2,943,820 | 7/1960 | Westcott, Jr. | 244/103 |
| 2,957,650 | 10/1960 | Horan et al. | 244/50 |
| 2,970,792 | 2/1961 | Holmes | 244/50 |
| 3,285,541 | 11/1966 | Fehring et al. | 244/50 |
| 3,288,991 | 11/1966 | Ellerd | 280/98 |
| 3,290,058 | 12/1966 | Ellerd | 280/98 |
| 3,516,625 | 6/1970 | Haiser et al. | 244/50 |
| 5,242,131 | 9/1993 | Watts | 244/50 |

FOREIGN PATENT DOCUMENTS 514979  2/1955  Italy .

Primary Examiner—Virna Lissi Mojica
Attorney, Agent, or Firm—Conrad O. Gardner

[57] ABSTRACT

An airplane steering system which permits 180 degree turns with minimum tire scrub. The system involves steering of both the nose landing gear and the front and rear wheels of both main landing gear each consisting of three inline wheels; thus, the center of turn is placed between the main gears and allows the airplane to make 180 "pirouette" turns.

4 Claims, 4 Drawing Sheets

PIROUETTE TURN

PIROUETTE TURN

NORMAL STEERED TURN

AIRPLANE PIROUETTE STEERING SYSTEM

RELATED APPLICATIONS

This is a continuation in part application of application Ser. No. 08/209,667 filed Mar. 9, 1994, now abandoned also assigned to The Boeing Company.

BACKGROUND OF THE INVENTION

1. Field of the Invention

This invention relates to airplane pirouette steering systems and more particularly to pirouette steering systems for U-turning large aircraft in a minimal amount of runway width.

2. Description of the Prior Art

As airplane types get larger, their landing gear wheel base and wheel track also typically get larger. Airplane types with longer wheel base and wider track are more likely to encounter possible problems of one or more wheels running off the runway or taxi way paved surface when trying to U-turn on a runway. Even if paved shoulders are provided, wheels running off the runway edge may run into edge lights or signs. Large airplanes may have difficulty executing U-turns in a 150 ft. wide runway. Some very large airplanes may even have difficulty executing U-turns in a 200 ft. wide runway.

In the prior art, pilots have accomplished U-turns on runways with large aircraft by using good piloting judgment to minimize main gear tire to runway edge separation margins (also called "edge margins"), by doing turns at low speed, and occasionally by using differential thrust and/or brakes to increase turning moment above that available from nose wheel steering alone. The use of aircraft main gear steering to minimize tire scrub has also been practiced in the prior art (e.g., in the steerable body gear; see U.S. Pat. No. 3,516,625 assigned to The Boeing Company).

U.S. Pat. No. 3,285,541 (Fehring, et al) assigned to The Boeing Company, shows a variable flotation landing gear enabling 180 degree turns, and nose gear with 90 degree steering capability, however, each main gear requires two separate shock struts, each with single axles supporting four wheels per strut. To retract the gear, each strut is actuated separately, one forward, one rearward and the canted axis rotates the axles through 90 degrees for minimum stowage. The nose gear has two struts also. With reference to FIG. 8, to execute a "pirouette" turn, the shock strut inner cylinders and axles are actuated so their axes are in line about a common center of turn.

U.S. Pat. No. 5,242,131 (Watts) assigned to The Boeing Company is illustrative of steerable landing gear wherein a six wheel, three axle main gear is utilized.

SUMMARY OF THE INVENTION

In principle turning the nose gear to about 90 degrees and the airplane turning about point at the airplane centerline is the same as shown in U.S. Pat. No. 3,285,541 to Fehring et al but the configuration of the landing gear is different in this respect. As hereinafter claimed the landing gear shown is a truck type arrangement with 3 axles on a single truck beam similar to the Boeing Model 777 but where the forward and aft axles are steered relative to the truck beam, unlike 777 which only steers the aft axle. (refer to my U.S. Pat. 5,242,131 Steerable Landing Gear incorporated herein by reference. Whereas the landing gear shown on the Fehring et al '541 is a single post arrangement with no truck beam where the axle is steered in a manner similar to any nose gear found in the industry.

It is an object to the invention to provide an airplane pirouette turning system for U-turning a large aircraft in minimal runway width.

It is a further object to the invention to provide an airplane pirouette turning system for a right turn wherein the turn center lies between the main gear legs.

The above objects of the invention are achieved by steering the nose landing gear and the front and rear wheels of both main landing gear each consisting of three inline wheels thereby placing the center of turn between the main gears to allow the airplane to make 180 degree pirouette turns.

DESCRIPTION OF THE PREFERRED EMBODIMENT

Figure 1:
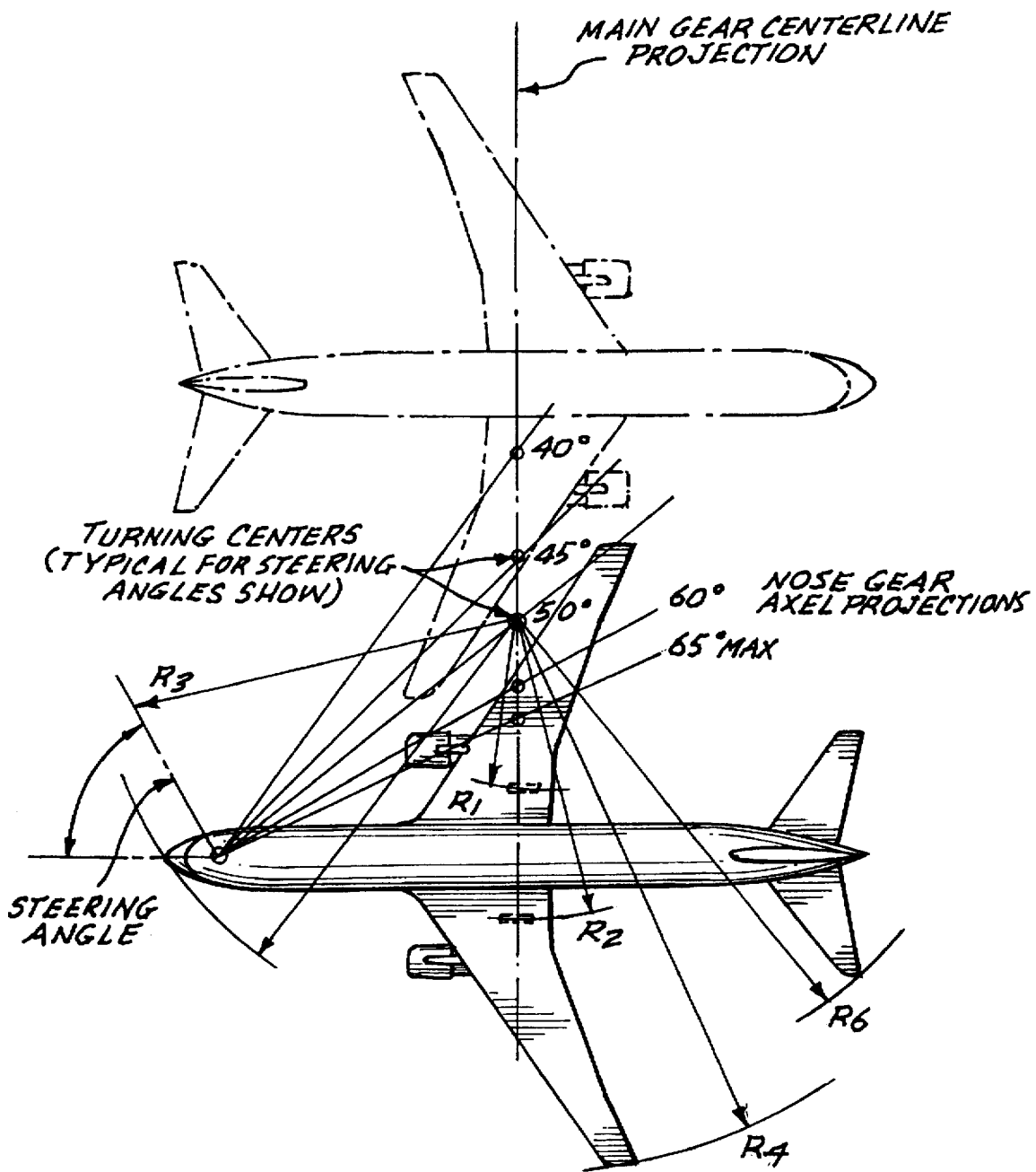
FIG. 1 is a plan view of an aircraft executing a tight conventional U-turn in accordance with the prior art.

A plan view of a typical airplane executing a "tight" conventional U-turn is shown in FIG. 1. It should be noted that when the airplane turns right, the turn center is located to the right of the right main landing gear, but close to the right main landing gear. Tighter turning requires reduced separation between the turn center and the right main gear wheels. If the main landing gear is a multiaxle bogie unit, this separation can not be reduced too much without resulting in excessive scrub angles on the main gear tires. The use of axle steering can reduce scrub angles somewhat.

Figure 2:
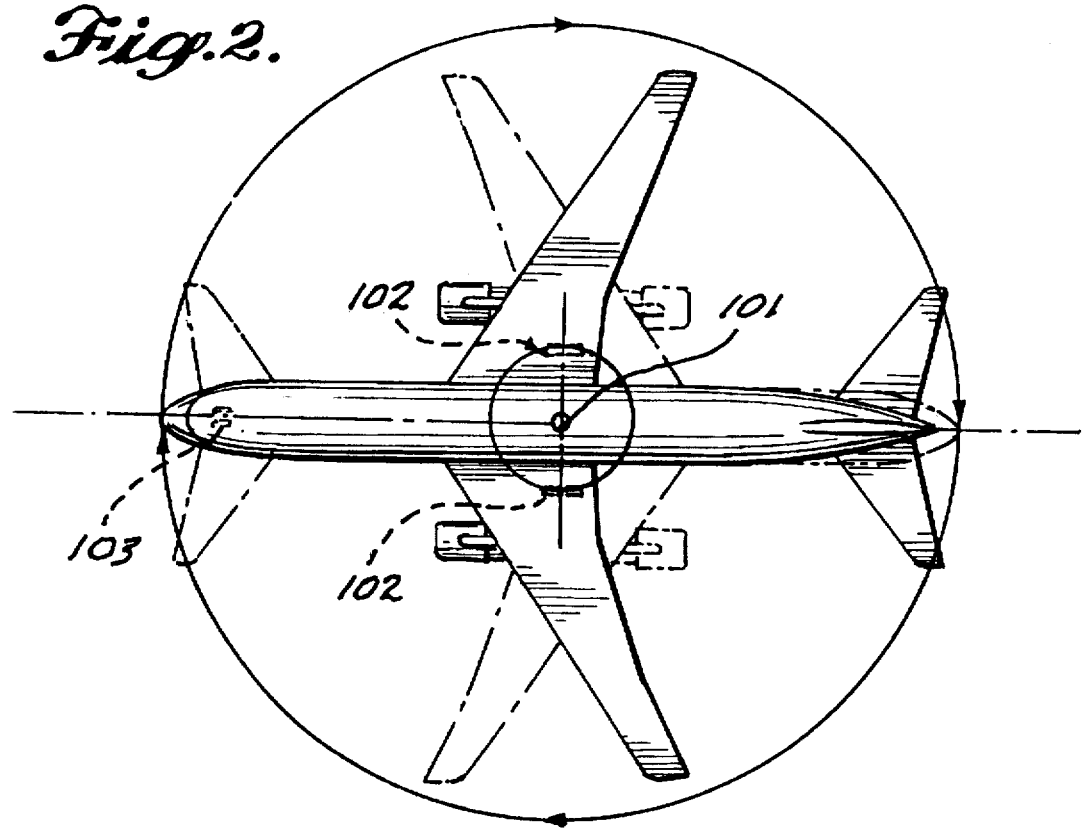
FIG. 2 is illustrative of pirouette steering with turn center substantially at the airplane centerline in accordance with a preferred embodiment of the present invention.

In contrast, pirouette steering is different conceptually. As shown in FIG. 2, turn center 101 for a right turn with pirouette steering lies between main gear legs 102 rather than outside on the right side. Preferably the turn center will be located substantially at the airplane centerline. Nose gear 103 is steered to about 90 degrees, and turning moment for the turn may be provided by primarily by differential thrust (e.g., L engine 105 forward, R engine 107 (reverse), powered nose wheel, differential powered main wheels, or other means.

Figure 3:
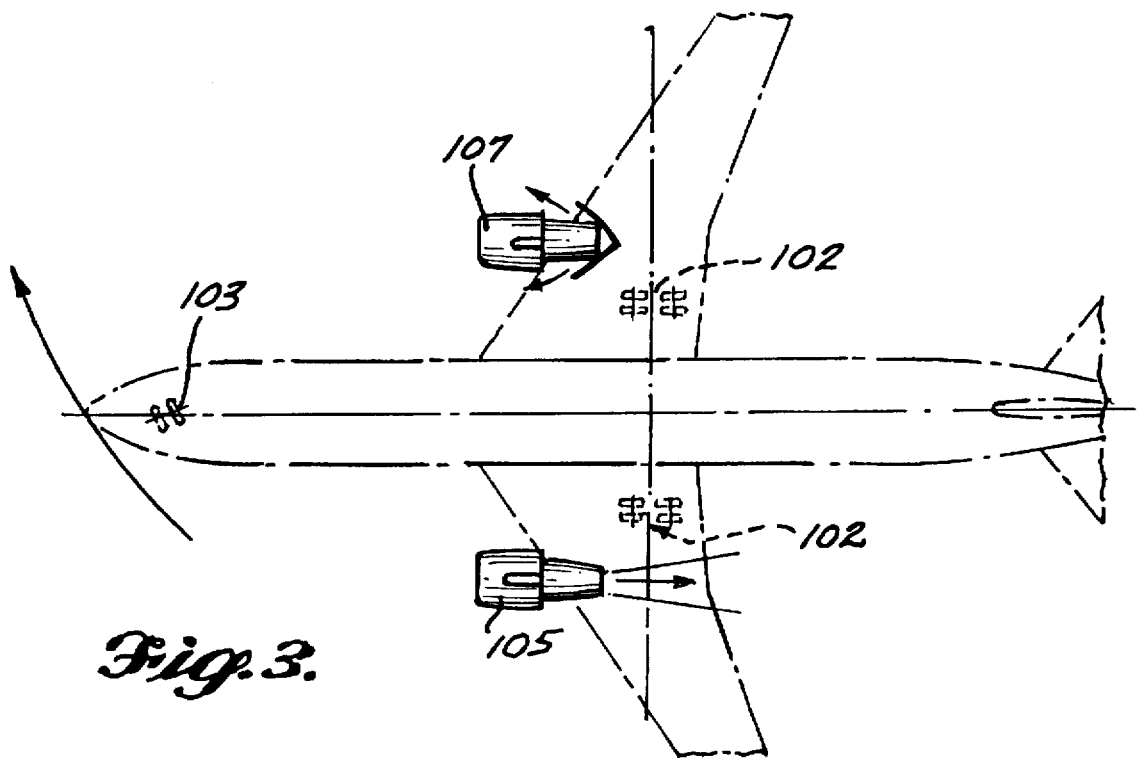
FIG. 3 is illustrative of an aircraft configured for right turn in accordance with the present pirouette steering.

For airplanes with multiaxle main gear trucks, (e.g., 4 six wheel trucks being shown on each side of the aircraft at FIG. 3), the forward and rear axles will preferably be steered as illustrated in FIG. 3 to minimize wheel scrub during the pirouette turn.

Figure 4:
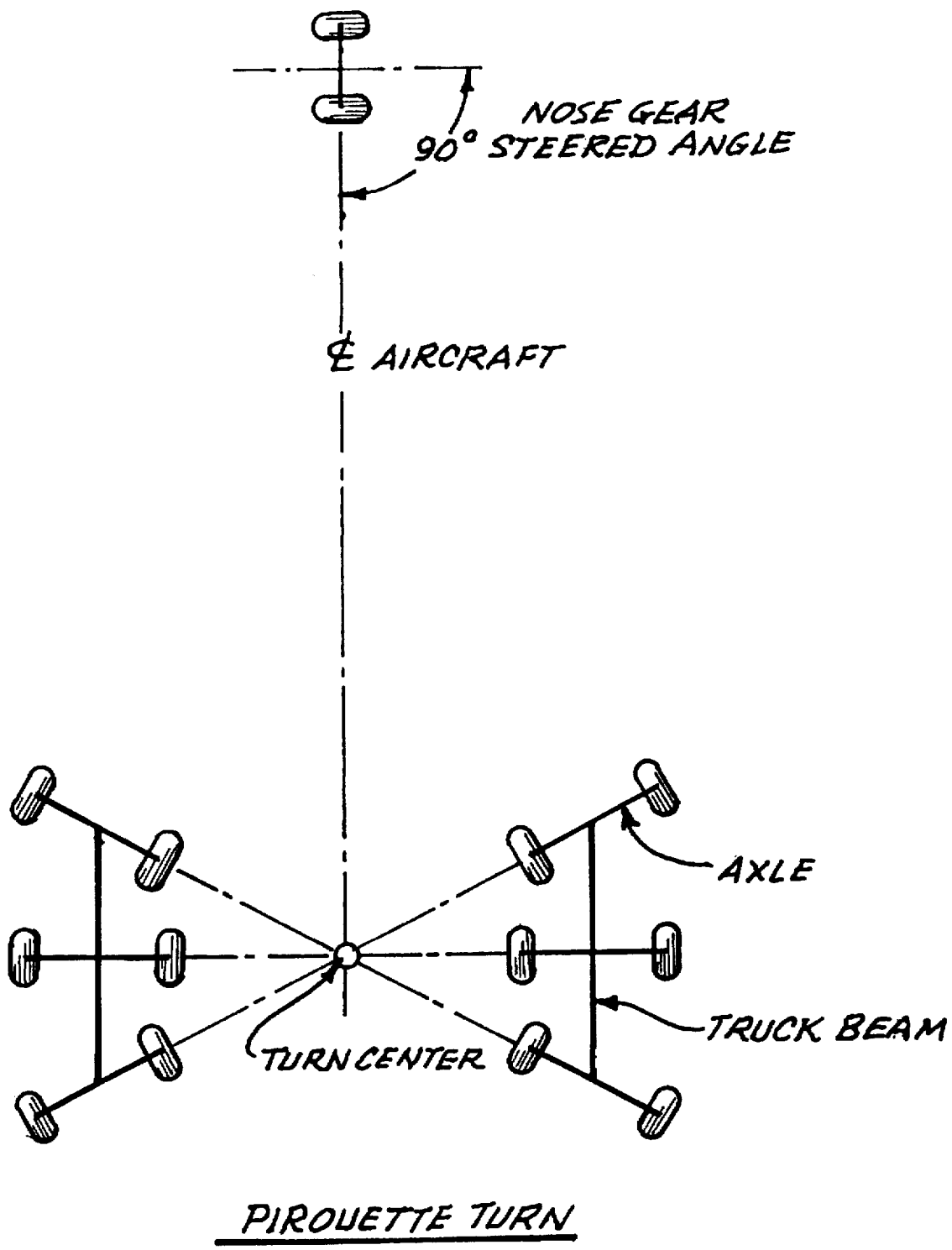
FIG. 4 is illustrative of a six wheel truck in pirouette turn.

Description of operation of Pirouette landing gear for multi-axle truck arrangements:

FIG. 4 shows a 6 wheel truck arrangement which has steerable forward and aft axles, the steering of these axles normally would be used to improve the steering capability of the aircraft and to reduce tire wear, in this mode the axles would be steered in a manner proportional to the nose gear steered angle, this would cause the aircraft to turn about a point geometrically in line with the center ale at the intersection point of a line projected from the centerline of the nose gear axle.

Figure 5:
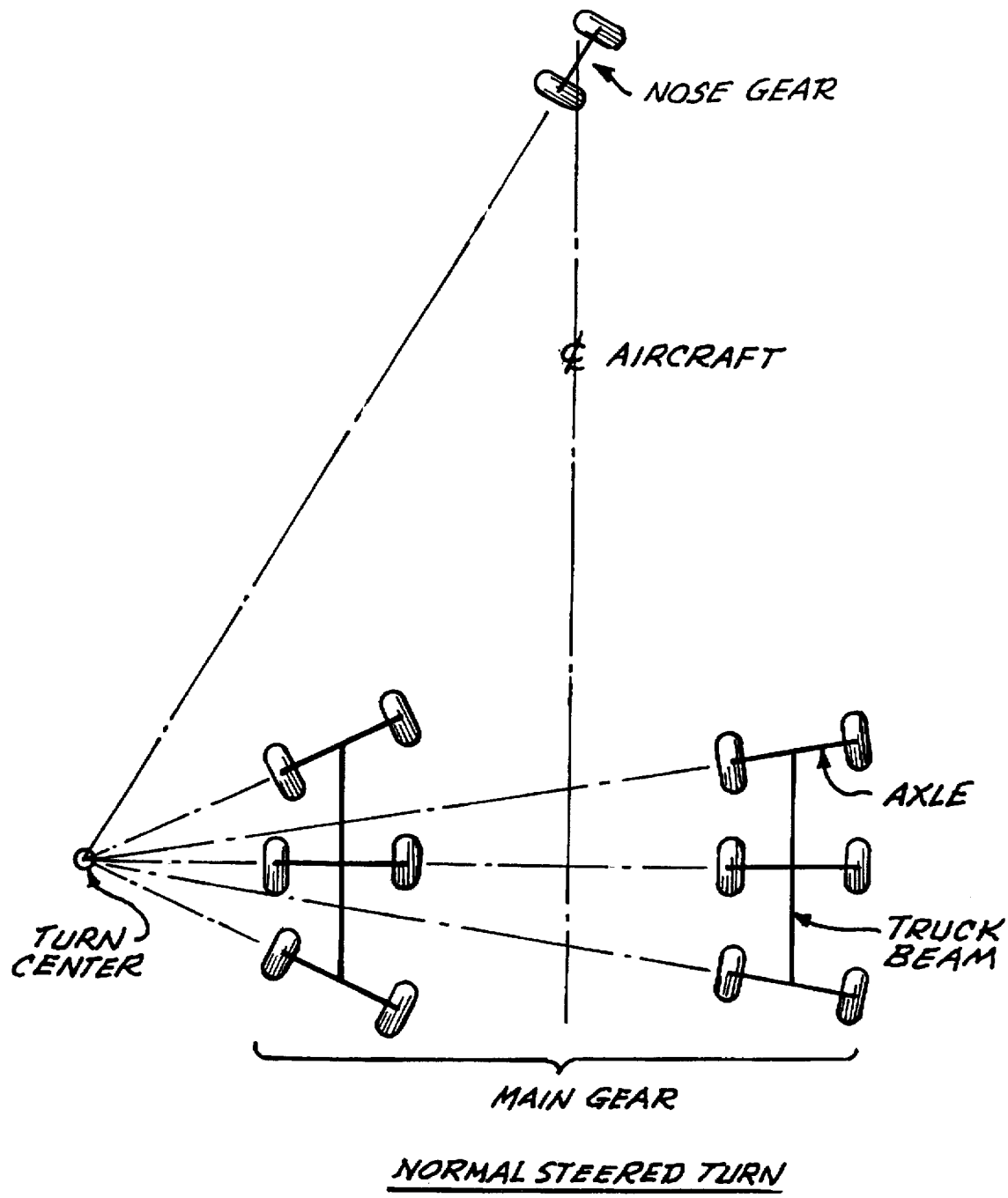
FIG. 5 is illustrative of a normal steered turn with nose gear at 90 degrees.

To be able to execute a U turn (180 degrees) on a narrow runway a pirouette turn would be invoked. For this type of turn the aircraft would come to a complete stop then the pilot would select the mode "PIROUETTE TURN". Next the pilot would steer the nose gear to 90 degrees, this action would also cause the main gear axles to steer to a geometry shown in FIG. 5 where the forward and aft axles point toward the intersection of the aircraft centerline and the centerline of the center axle. The pilot now selects asymmetric thrust causing the aircraft to rotate about said point until a complete U turn is achieved, at which point the aircraft stops and the normal steering mode is selected, symmetrical thrust is now applied and the aircraft proceeds.

What is claimed:

1. In an aircraft having nose wheels and main gear wheels including a three axled truck beam having forward and aft axles steered relative to the truck beam, a method for aircraft pirouette turning comprising the steps of:

steering the aircraft nose wheels to a steering angle of about 90 degrees;

generating a turning moment around a turn center located substantially at the aircraft centerline between the aircraft's main gear wheels; and wherein said step of generating a turning moment around a turn center located substantially at the aircraft centerline between the aircraft's main gear wheels comprises using differential engine thrust between left and right engines.

2. The invention according to claim 1 wherein generating a turning moment around a turn center located substantially at the aircraft centerline between the aircraft's main gear wheels comprises turning at least one of the axles each on the left and right main landing gears for minimizing main landing gear wheel scrub levels during a pirouette turn.

3. The invention according to claim 1 wherein generating a turning moment around a turn center located substantially at the aircraft centerline between the aircraft's main gear wheels comprises using forward and rearward powered main landing gear wheels on opposite sides of said aircraft.

4. The invention according to claim 1 wherein generating a turning moment around a turn center located substantially at the aircraft centerline between the aircraft's main gear wheels comprises using powered nose wheels.

* * * * *